(12) United States Patent
Hartley et al.

(10) Patent No.: US 8,473,376 B2
(45) Date of Patent: Jun. 25, 2013

(54) SYSTEM, METHOD, AND COMPUTER PROGRAM PRODUCT FOR BYTE-BASED UTILITY COMPUTING PRICING

(75) Inventors: John J. Hartley, Sunnyvale, CA (US); J. Darrel Thomas, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 991 days.

(21) Appl. No.: 11/087,536

(22) Filed: Mar. 23, 2005

(65) Prior Publication Data

US 2006/0218059 A1  Sep. 28, 2006

(51) Int. Cl.
*G06F 19/00* (2011.01)
(52) U.S. Cl.
USPC .................. 705/30; 705/32; 705/34
(58) Field of Classification Search
None
See application file for complete search history.

(56) References Cited

U.S. PATENT DOCUMENTS

| | | | |
|---|---|---|---|
| 6,088,659 A | 7/2000 | Kelley et al. | |
| 6,208,977 B1 | 3/2001 | Hernandez et al. | |
| 6,295,294 B1 * | 9/2001 | Odlyzko | 370/389 |
| 6,338,046 B1 * | 1/2002 | Saari et al. | 705/34 |
| 7,260,518 B2 * | 8/2007 | Kerr et al. | 703/27 |
| 7,313,827 B2 * | 12/2007 | Kelley et al. | 726/28 |
| 7,320,131 B1 * | 1/2008 | O'Toole, Jr. | 718/104 |
| 2002/0166117 A1 | 11/2002 | Abrams et al. | |
| 2004/0117224 A1 | 6/2004 | Agarwal et al. | |
| 2005/0010502 A1 | 1/2005 | Birkestrand et al. | |

OTHER PUBLICATIONS

International Search Report issued on Sep. 28, 2007 in connection with PCT Application No. PCT/US06/02805.
EP Search Report dated Oct. 8, 2010 cited in Appl. No. 067339309 filed Jan. 26, 2006.

* cited by examiner

*Primary Examiner* — Fahd Obeid

(57) ABSTRACT

A system, method, and computer program product for byte-based utility computing pricing. A method for accounting for data processing system service usage includes metering network usage and integrating network usage over a billing period to determine a total network usage. The method includes metering storage usage and integrating storage usage over the billing period to determine a total storage usage. The method includes metering processor usage and integrating processor usage over the billing period to determine a total processor usage. The method includes summing the total network usage, total storage usage, and total processor usage to determine a total customer usage, and determining a total customer bill according to the total customer usage and a billing rate.

15 Claims, 3 Drawing Sheets

SYSTEM, METHOD, AND COMPUTER PROGRAM PRODUCT FOR BYTE-BASED UTILITY COMPUTING PRICING

TECHNICAL FIELD OF THE INVENTION

The present invention is directed, in general, to techniques for providing and billing computer resources and services.

BACKGROUND OF THE INVENTION

Computer service vendors provide a wide range of services, and an increasing number of companies are becoming consumers of the various services. Services available today include telecom (telecommunications, datacenter network services, mobile/edge communications services), computational services (compute), both application layer and infrastructure layer, and data storage (storage).

Unfortunately, billing standards and methods differ greatly between different vendors and between different types of services. Different types of services may be billed by flat-rate, by the day, week, or month, by the byte (or multiple thereof), or on a per-minute basis. Other factors include data speed and tiered service levels.

These varying billing methods cause unnecessary duplication, overhead, and other management issues.

There is, therefore, a need in the art for a system, process and data format for unified billing for computing services.

SUMMARY OF THE INVENTION

A preferred embodiment provides system, method, and computer program product for byte-based utility computing pricing. This embodiment provides a unified pricing unit for storage, network transport, and processing power, enabling the provider to efficiently and effectively charge the consumer for use of computing power and resources.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
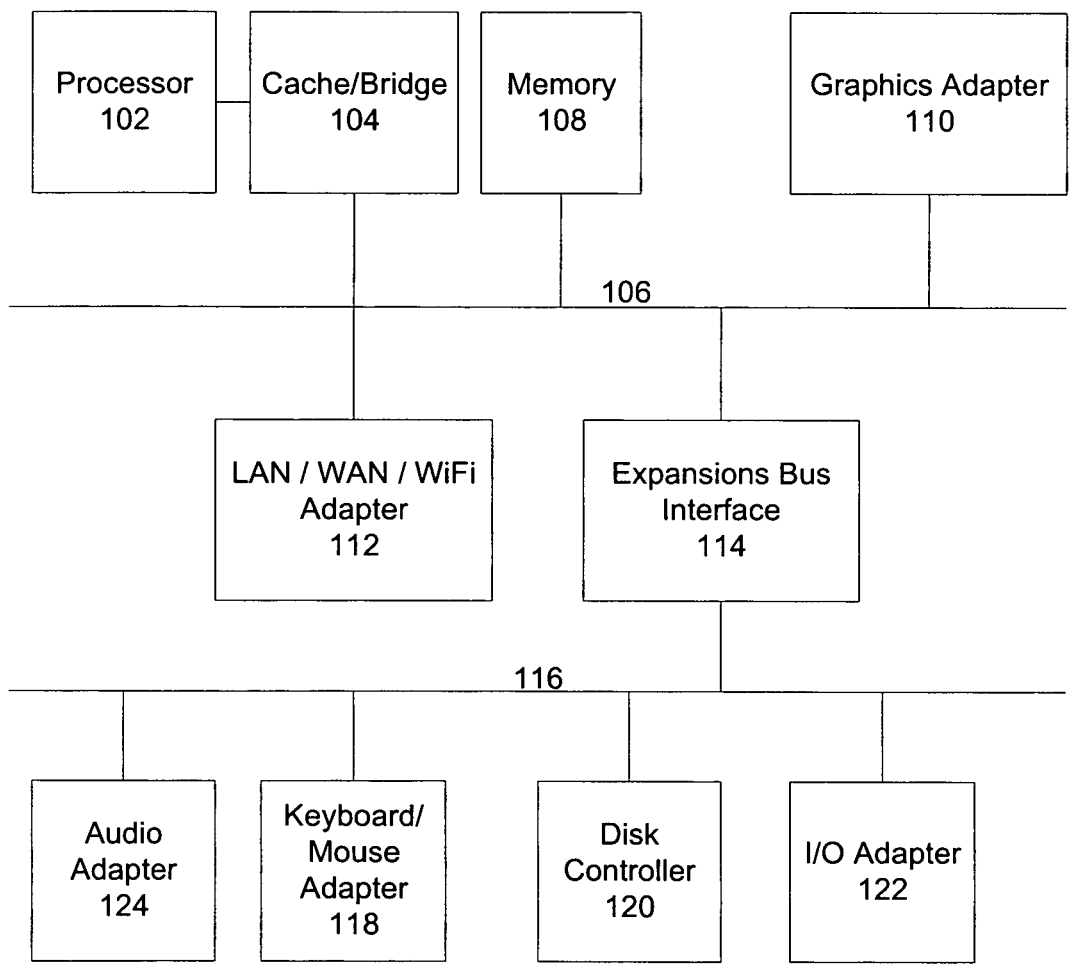
FIG. 1 depicts a block diagram of a data processing system in which a preferred embodiment can be implemented.
Figure 2:
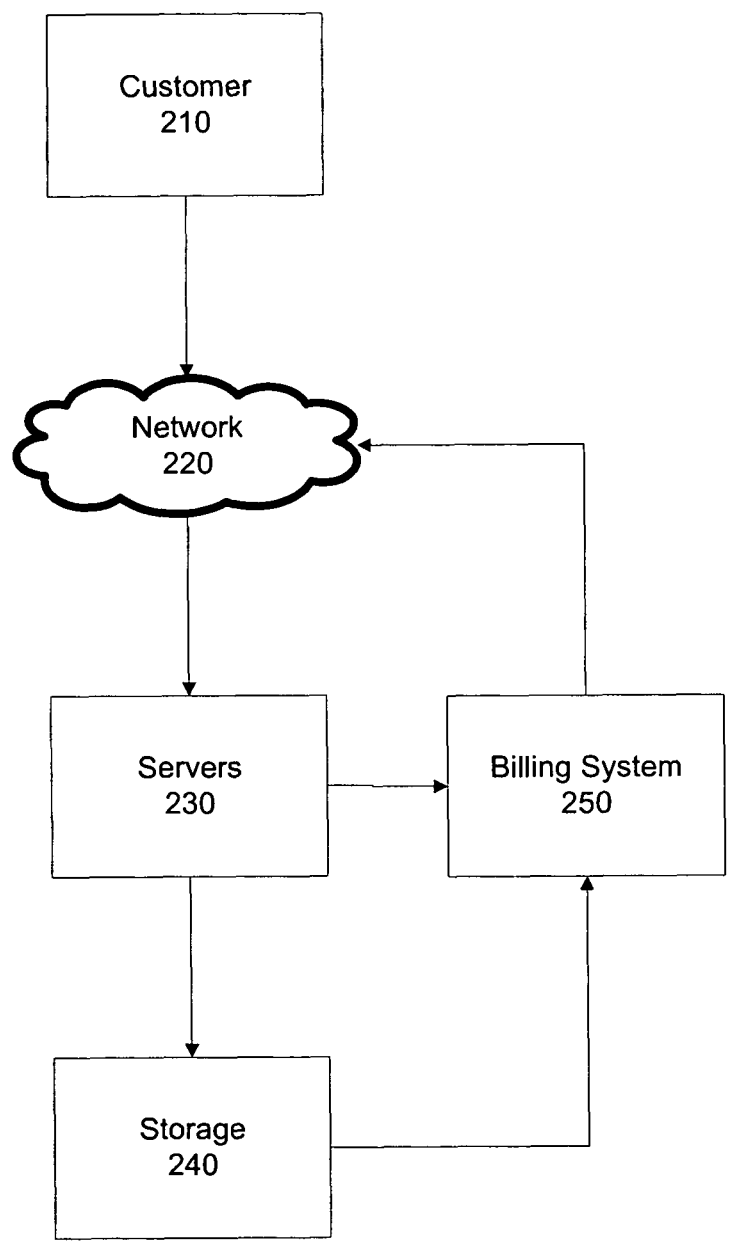
FIG. 2 depicts a block diagram of a simple network system in which a preferred embodiment can be implemented.
Figure 3:
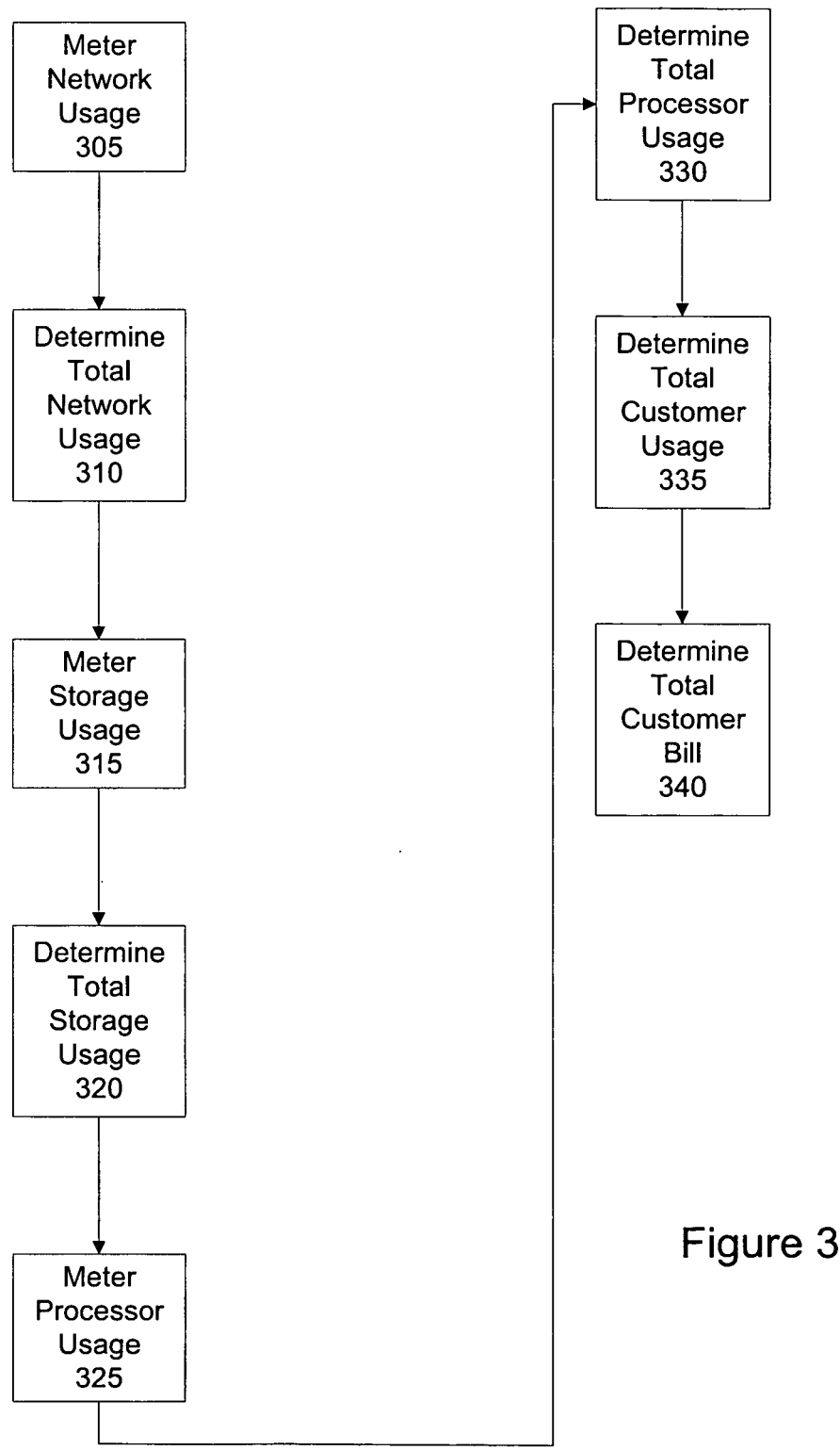
FIG. 3 depicts a flowchart of a process in accordance with a preferred embodiment.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

FIG. 1 depicts a block diagram of a data processing system in which a preferred embodiment can be implemented, as any of the systems described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

A preferred embodiment provides system, method, and computer program product for byte-based utility computing pricing. This embodiment provides a unified pricing unit for storage, network transport, and processing power, enabling the provider to efficiently and effectively charge the consumer for use of computing power and resources.

The preferred embodiments are focused on billing for use of the infrastructure layer of computing. Those of skill in the art will recognize that the claimed system and method can be modified for use in billing for use of the application tier of the computing stack, based upon the application context.

Electricity provides a good example of the infrastructure/application division. When people buy electricity, they receive energy in a very fundamental form. Electricity itself is not very useful, it needs compliments to make it valuable. The electricity user buys other things like appliances, air conditioners, lights, computers, etc.—"applications"—in order to make something truly useful.

At the infrastructure layer in the electricity world, however, power is provided in a standards-based fashion, e.g., either alternating or direct current format, at a certain voltage, etc. These standards are necessary to have a variety of applications available, but the applications themselves are left up to the customers to choose.

Various embodiments described herein therefore define an analogous unit—a computing "kilowatt-hour". This unit can then be used to price a wide array of utility computing services. One example of the use of such a unit is the INFO-WATT services of Electronic Data Systems Corporation.

At the infrastructure computing layer, a typical service provider fundamentally provides 3 types of service, as illustrated below with reference to FIG. 2: storing bits (storage); moving bits (telecommunications in all forms); and transforming some bits into new bits (compute processing).

The bit is the fundamental unit of measurement for information, defined as the amount of information in a system having two possible states. Bytes, Kilobytes (KB), Megabytes (MB), Gigabytes (GB), Terabytes (TB), Petabytes (PB), etc., are all just aggregations of bits.

FIG. 2 depicts a block diagram of a simple network system in which a preferred embodiment can be implemented. This figure shows customer system 210, connected to network 220. Network 220 can be single or multiple networks, a public network, a private or secure network, or a combination of these.

Also connected to network 220 are servers 230. Servers 230 can be implemented in single or multiple servers, and while shown as a single block for clarity, servers 230 can be located in multiple different locations.

Connected to servers 230 is storage 240, for storing data. Storage 240 can be multiple storage devices, as known to those of skill in the art, and can be in multiple different locations. In other embodiments, storage 240 is connected directly to network 220.

Billing system 250 is connected to communicate with and monitor network 220, servers 230, and storage 240, as described below. Note that billing system 250 need not be directly attached to any of these devices, as long is it can monitor byte usage as described herein.

In a computing services definition that focuses on outputs rather than the traditional inputs of servers, routers, etc. a universal computing unit is then rationally related to bits and time. This is because the provider is handling information (bits) over the course of time (hours, a month, etc.). This is similar to a kilowatt-hour, a Watt being Joules/s and an hour being 3600 s, so a kilowatt-hour is just another way to say 3,600,000 Joules. Joules are a measurement of energy, and Watts are measure of the rate at which energy is supplied, or power. This is how the a byte-based pricing method relates to the above listed computing functions, according to a preferred embodiment:

Storage: Take the function of gigabits per day over time, and integrate this function over one month's time to compute bits (or GB, etc.). Note that the one-month figure is exemplary; the storage use can be computed over any appropriate time period. Total storage for a customer is shown generically in this embodiment as storage 240.

$$\text{Total Storage} = \int \frac{GB}{\text{day}} dt$$

Telecommunications: Similar to storage, measure the rate at which bits moved across the wire or through the network devices over a month and arrive at an overall bit count by integrating the rate (often measured in megabits per second) over time. Telecom usage over network 230 is monitored, in the preferred embodiment, by billing system 250.

Total Telecom=∫Mbps dt

Processing: Like the other computing functions, computer processors handle chunks of bits. The MIPS, clock speeds, etc. all eventually translate into bits once it is determined how many bits per instruction the machine can handle, e.g. bits/instruction*instructions/second*seconds=total bits processed. A preferred embodiment includes a billing system 250 that meters the bit processing, and measures this at the process/customer level in a server system 230 where CPUs are all shared, a capability available in some of the latest virtual machine software, as known to those of skill in the art. The bit processing rate, in bytes per second, integrated over time yields the processed bits.

$$\text{Servers} = \int \frac{B}{s} dt$$

As used herein, this basic unit will be referred to as an "information value unit" (IVU). Assume that 1 IVU is equal to 1 gigabyte (GB) of information (combined storage, telecommunications, and processing) in a given month. Of course, this value of the IVU is arbitrary for the sake of this discussion, and can be defined as needed for a particular application. Thus, a customer with 1 terabyte (TB) of storage who moved 5 GB of information through telecom and processed 60 GB through the provider's processors would be billed for the sum of these, or 1.065 MegaIVUs. The $/IVU price might vary based upon how different customers consume information management resources.

For example, assume that compute power is more valuable than storage and telecoms, a customer who tends to use more CPU resources might have a higher price. The provider can then periodically benchmark use patterns and adjust prices. Utilities do this, and the ability to throttle prices allows efficient adjustment to supply and demand conditions.

While bit- or byte-based pricing is known in data telecoms and storage systems, there is no precedent within for byte-based pricing of an integrated computing infrastructure service where the pricing for all aspects of the service, including processing, are byte-based.

The total cost to the customer, then, is a function of the sum of the three integrals for processing, storage, and telecom.

FIG. 3 depicts a flowchart of a process in accordance with a preferred embodiment. This process assumes that a customer already has an account, and that all proper security and authentication measures are taken.

First, monitor the network usage (telecom) to determine the customer's usage in Mb/s (step 305). Next, integrate the network usage over the billing period (step 310), one month in this example, to determine a network usage total.

Next, monitor the storage usage to determine the customer's usage in GB/day (step 315). Next, integrate the storage usage over the billing period (step 320), one month in this example, to determine a storage usage total.

Next, monitor the processor usage to determine the customer's usage in B/sec (step 325). Next, integrate the storage processor over the billing period (step 330), one month in this example, to determine a processor usage total.

Next, determine a total customer usage, by summing the network usage total, the storage usage total, and the processor usage total (step 335). Finally, determine a total customer bill (step 340), according to the total customer usage and a billing rate.

The total customer bill is not necessarily inclusive of all items that might be billed to the customer.

Of course, in alternate embodiments, each type of usage is billed at a different rate, and then the total bills for each can be summed. Of course, the units by which each type of usage is monitored can be changed as needed, although the preferred embodiment indicates that each measurement should be byte-based, as can the time over which the usage is integrated. In other embodiments, instead of any integration, a simple running total of all usage is maintained. Those of skill in the art will recognize that not all steps described above need be performed in the order recited.

In some embodiments, the actual metering is not performed by the same system that performs the integrating and billing functions. In these embodiments, the metered usage data is received by the data processing system and computer program product, then is used for process and calculates a total customer bill.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of medium utilized to actually carry out the distribution. Examples of machine usable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for accounting for data processing system service usage, comprising:
    metering, with a data processing system, network usage in network usage bits per unit time;
    integrating, with the data processing system, network usage over a billing period to determine a total number of network usage bits;
    metering, with the data processing system, storage usage in storage usage bits per unit time;
    integrating, with the data processing system, storage usage over the billing period to determine a total number of storage usage bits;
    metering, with the data processing system, processor usage in processor usage bits per unit time;
    integrating, with the data processing system, processor usage over the billing period to determine a total number of processor usage bits;
    converting, with the data processing system, the total number of network usage bits into a first number of information value units;
    converting, with the data processing system, the total number of storage usage bits into a second number of the information value units;
    converting, with the data processing system, the total number of processor usage bits into a third number of the information value units;
    summing, with the data processing system, the first number and the second number and the third number of the information value units to determine a total number of the information value units;
    multiplying, with the data processing system, the total number of the information value units by an amount of money per information value unit to provide a total customer bill, wherein the amount of money per information value unit is adjusted based on customer usage patterns of network usage, storage usage, and processor usage and the relative value of network usage, storage usage, and processor usage; and
    storing, with the data processing system, the total customer bill.

2. The method of claim 1, wherein the network usage is metered in megabits per second.

3. The method of claim 1, wherein the storage usage is metered in gigabytes per day.

4. The method of claim 1, wherein the processor usage is metered in bytes per second.

5. The method of claim 1, wherein the network usage and storage usage are metered in byte-based units.

6. A data processing system comprising: a processor and accessible memory, wherein the data processing system is configured to perform the steps of
- receiving network usage data in network usage bits per unit time;
- integrating the network usage data over a billing period to determine a total network usage;
- receiving storage usage data in storage usage bits per unit time;
- integrating the storage usage data over the billing period to determine a total storage usage;
- receiving processor usage data in processor usage bits per unit time;
- integrating the processor usage data over the billing period to determine a total processor usage;
- converting the total network usage into a first number of information value units;
- converting the total storage usage into a second number of the information value units;
- converting the total processor usage into a third number of the information value units;
- summing the first number and the second number and the third number of the information value units to determine a total number of the information value units;
- multiplying the total number of the information value units by an amount of money per information value unit to provide a total customer bill, wherein the amount of money per information value unit is adjusted based on customer usage patterns of network usage, storage usage, and processor usage and the relative value of network usage, storage usage, and processor usage; and
- storing the total customer bill.

7. The data processing system of claim 6, wherein the network usage data is metered in megabits per second.

8. The data processing system of claim 6, wherein the storage usage data is metered in gigabytes per day.

9. The data processing system of claim 6, wherein the processor usage data is metered in bytes per second.

10. The data processing system of claim 6, wherein the network usage data and the storage usage data are metered in byte-based units.

11. A computer program product tangibly embodied in a non-transitory machine-readable medium, comprising:
- instructions for receiving network usage data in network usage bits per unit time;
- instructions for integrating the network usage data over a billing period to determine a total number of network usage bits;
- instructions for receiving storage usage data in storage usage bits per unit time;
- instructions for integrating the storage usage data over the billing period to determine a total number of storage usage bits;
- instructions for receiving processor usage data in processor usage bits per unit time;
- instructions for integrating the processor usage data over the billing period to determine a total number of processor usage bits;
- instructions for converting the total number of network usage bits into a first number of information value units;
- instructions for converting the total number of storage usage bits into a second number of the information value units;
- instructions for converting the total number of processor usage bits into a third number of the information value units;
- instructions for summing the first number and the second number and the third number of the information value units to determine a total number of the information value units;
- instructions for multiplying the total number of the information value units by an amount of money per information value unit to provide a total customer bill, wherein the amount of money per information value unit is adjusted based on customer usage patterns of network usage, storage usage, and processor usage and the relative value of network usage, storage usage, and processor usage; and
- instructions for storing the total customer bill.

12. The computer program product of claim 11, wherein the storage usage data is metered in gigabytes per day.

13. The computer program product of claim 11, wherein the processor usage data is metered in bytes per second.

14. The computer program product of claim 11, wherein the network usage data and the storage usage data are metered in byte-based units.

15. The computer program product of claim 11, wherein the network usage data is metered in megabits per second.

* * * * *